B. C. STICKNEY.
COMBINED TYPE WRITING AND COMPUTING MACHINE.
APPLICATION FILED JULY 26, 1912.
1,270,243.
Patented June 18, 1918.
7 SHEETS—SHEET 1.
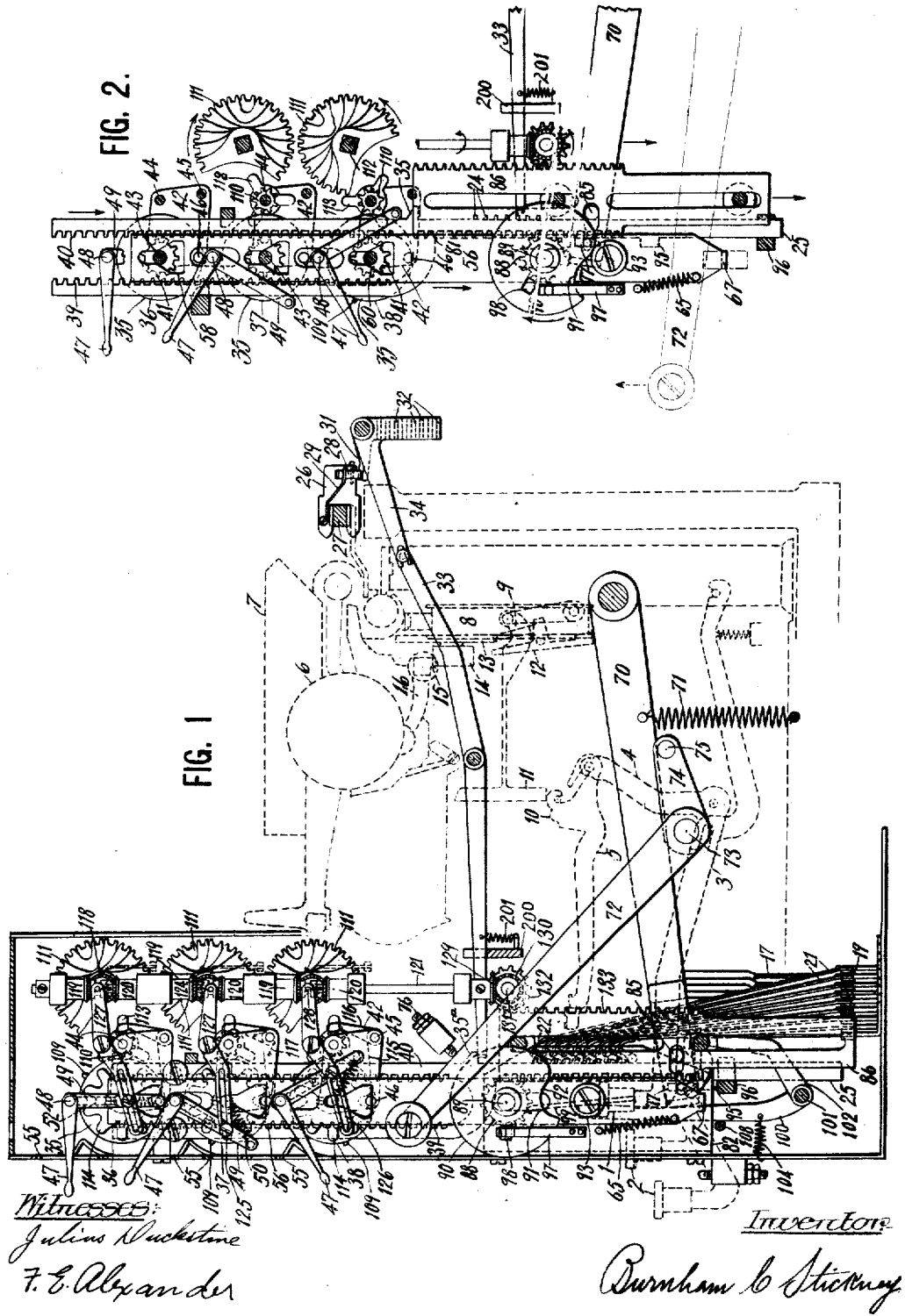

B. C. STICKNEY.
COMBINED TYPE WRITING AND COMPUTING MACHINE.
APPLICATION FILED JULY 26, 1912.

1,270,243.

Patented June 18, 1918.
7 SHEETS—SHEET 2.

Witnesses:
Julius Duckstine
F. E. Alexander

Inventor
Burnham C. Stickney

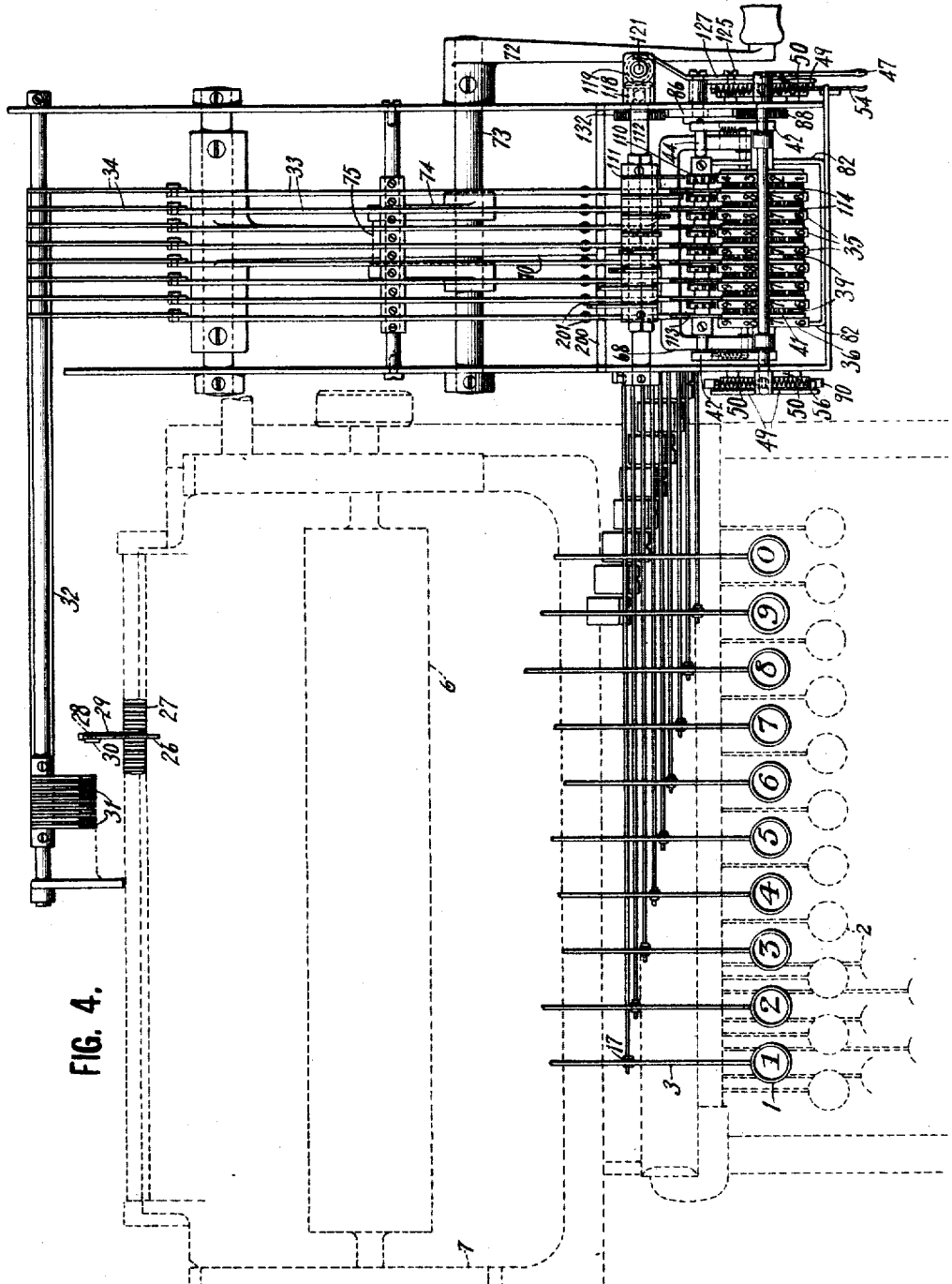

B. C. STICKNEY.
COMBINED TYPE WRITING AND COMPUTING MACHINE.
APPLICATION FILED JULY 26, 1912.
1,270,243.
Patented June 18, 1918.
7 SHEETS—SHEET 4.
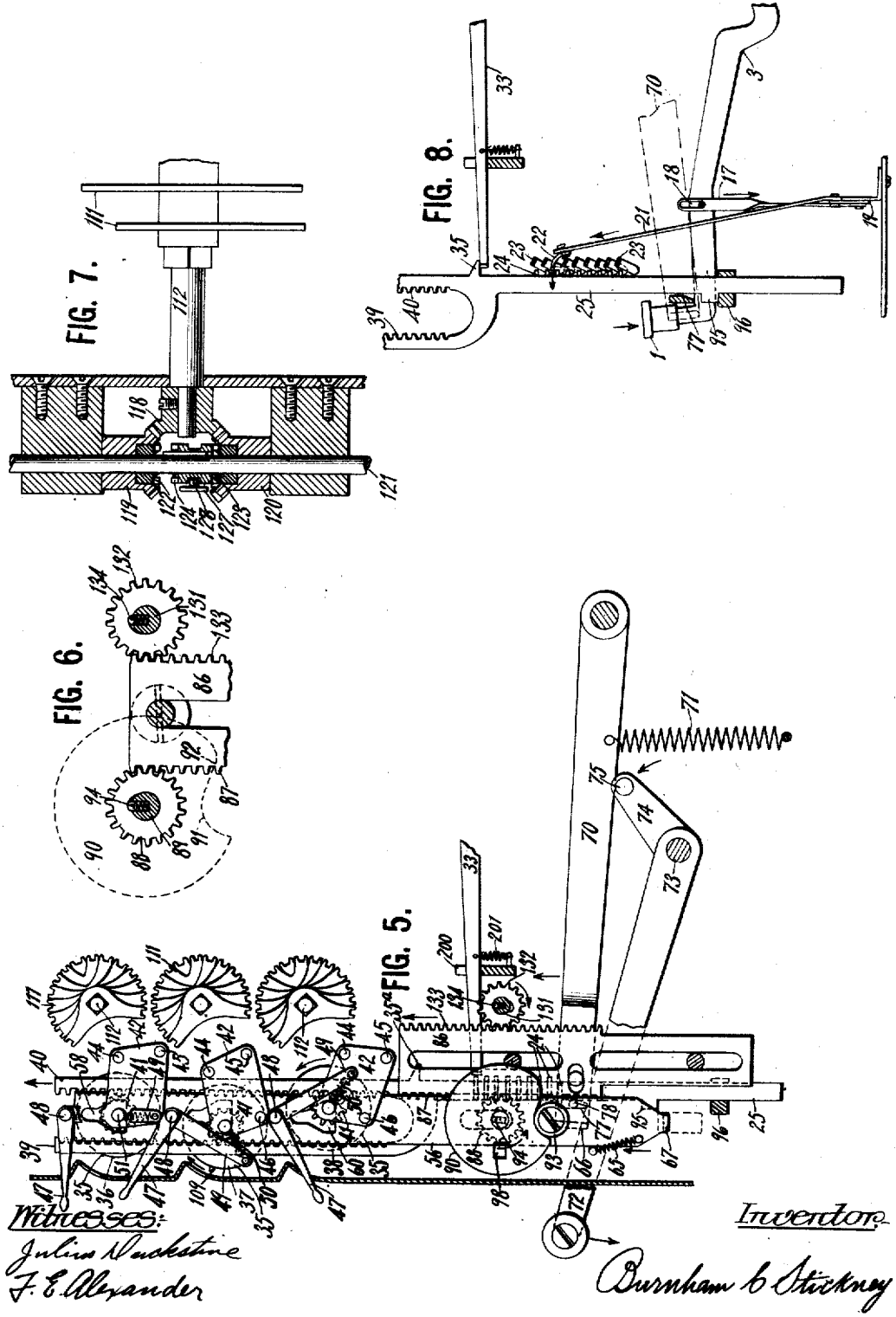

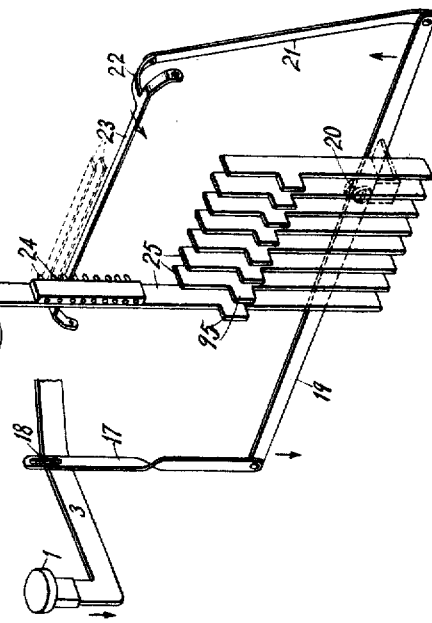
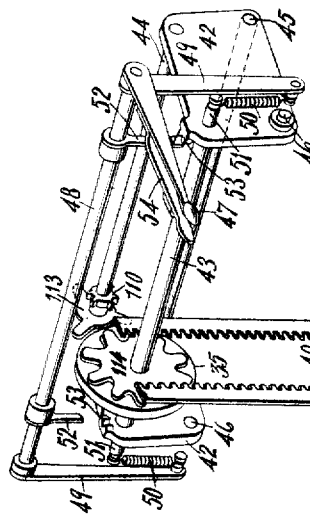
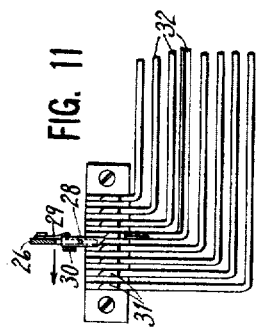
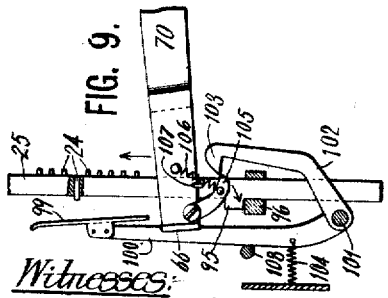
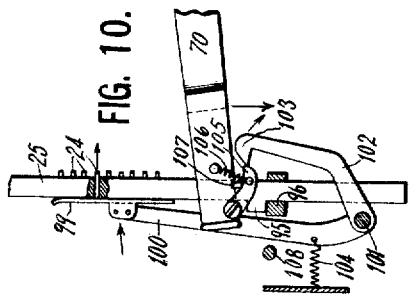

B. C. STICKNEY.
COMBINED TYPE WRITING AND COMPUTING MACHINE.
APPLICATION FILED JULY 26, 1912.
1,270,243.
Patented June 18, 1918.
7 SHEETS—SHEET 6.
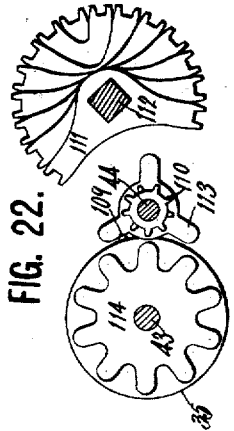
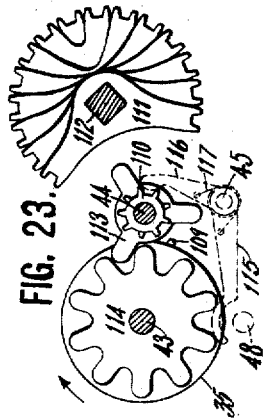
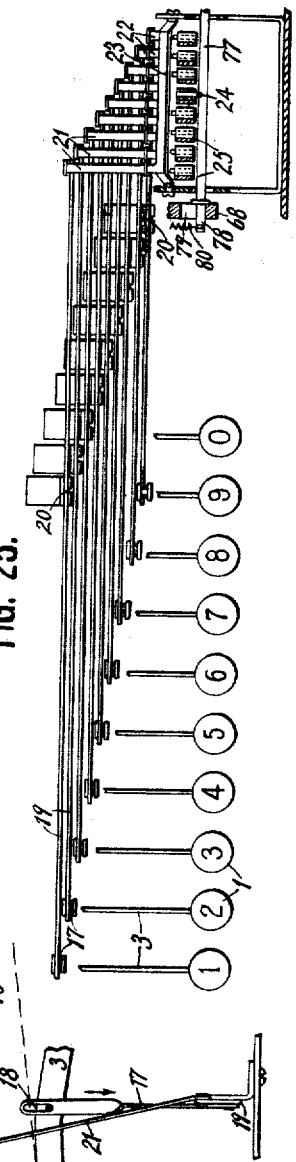

B. C. STICKNEY.
COMBINED TYPE WRITING AND COMPUTING MACHINE.
APPLICATION FILED JULY 26, 1912.
1,270,243.
Patented June 18, 1918.
7 SHEETS—SHEET 7.
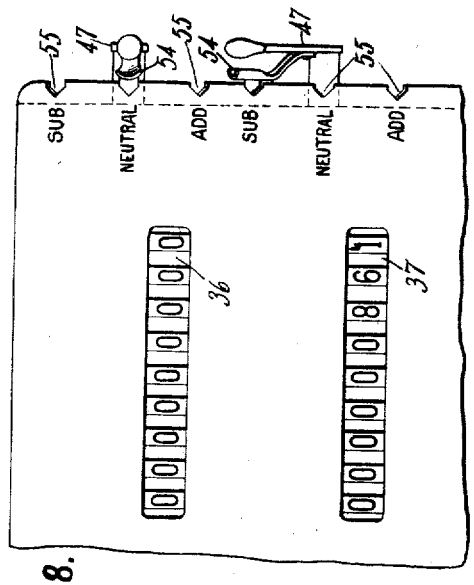
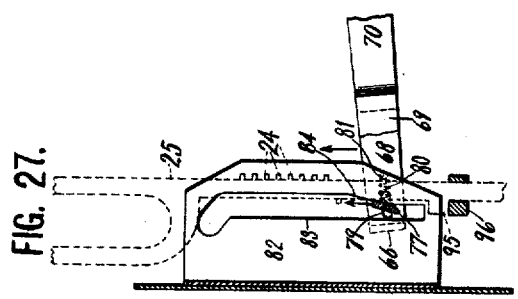
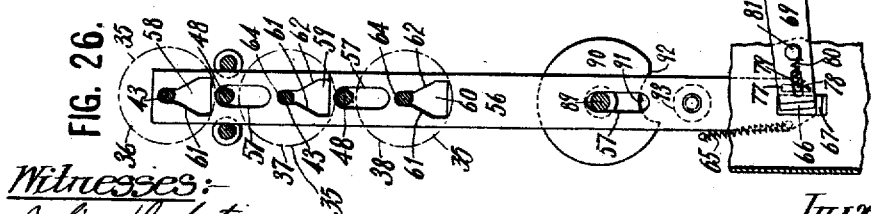

UNITED STATES PATENT OFFICE.

BURNHAM C. STICKNEY, OF ELIZABETH, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,270,243.      Specification of Letters Patent.      Patented June 18, 1918.

Application filed July 26, 1912. Serial No. 711,633.

*To all whom it may concern:*

Be it known that I, BURNHAM C. STICKNEY, a citizen of the United States, residing in Elizabeth, in the county of Union and State of New Jersey, have invented certain new and useful Improvements in Combined Type-Writing and Computing Machines, of which the following is a specification.

This invention relates to a combined typewriting and computing machine of the indexing type, and is an improvement on my application filed March 23, 1912, No. 685,652 (now Patent No. 1,186,520, of June 6, 1916).

A feature of this invention is to arrange in a type of computing machine which first indexes or sets up the whole number to be computed, and then runs up the number all at once, a series of computing heads or totalizers in a convenient position in the upper part of the machine, and off to one side, so that they will be readily visible and yet out of the way.

A further feature of this invention is to provide a plurality of computing heads which are capable of existing under a plurality of states, that is, adding, subtracting and being neutral or inactive, and arranged so that any or all can exist under the same or different states at the same time, whereby the same number can be computed in different computing heads at the same time, either with the same or different kinds of computation.

In this embodiment of the invention, the computing heads are arranged in superposed relation, and their normal state is neutral. To change to adding or subtracting, a computing head is shifted bodily so as to bring the gears thereof into mesh with either one side or the other of a set of duplex rack bars, each having an adding rack and a subtracting rack. The rack bars are also valuating members having thereon nine pins each, corresponding to the numeral keys "1" to "9". The pins are settable to determine the extent of movement of the rack bars. Linkages actuated by the numeral keys are used to set the pins, but these linkages are normally out of alinement with or offset from the corresponding rows of pins. The movement of the typewriter carriage is utilized through a transposition mechanism to shift the pin-bearing rack bars successively as the corresponding columns come to the printing point, so that the pins thereon are brought into alinement with the setting linkages.

A general operator has a bar to engage the set pins so as to move the rack bars whereby the computing heads in active engagement therewith may be actuated. The controlling mechanism for each computing head may be set to govern the character of action thereof, but the computing heads are locked by a cam bar in their neutral position until the general operator is actually operated. The general operator when in action releases the locking bar, and the state controlling mechanisms which are of a yielding tension type, immediately swing their computing heads to bring the gears thereof into mesh with the adding or subtracting racks as the case might be, and in time to receive all of the upward movement thereof. Means is provided to shift all the computing heads to their neutral disconnected position before the rack bars start on their downward movement, so that the wheels of the computing heads will receive none of the downward movement thereof.

The tens-carrying or tens-borrowing according to whether a particular computing head is adding or subtracting is carried on during the downward or return stroke of the rack bars while the computing heads are in their normal neutral position. Assisting duplex sector gears for the tens-carrying action are driven in one direction or the other under the control of a clutch which is positioned according to the tentative state of the associated computing head.

Other features and advantages will hereinafter appear.

In the accompanying drawings,

Figure 1 is a side view in elevation shown partly in section and partly in diagram to bring out the new features.

Fig. 2 is a fragmentary side view in elevation of certain of the parts shown in Fig. 1, showing the first part of the return stroke of the duplex rack bars just as the computing heads have been forced to a neutral position in advance of the tens-carrying operation.

Fig. 4 is a top plan view.

Fig. 5 is a view in side elevation, showing certain of the parts shown in Figs. 1 and 2, with the computing heads in the predetermined position which they occupy when the rack bars have started their upward movement to transfer an indexed number thereto. The top computing head is shown neutral, the middle computing head subtracting, and the bottom computing head adding.

Fig. 6 is an enlarged detail view, showing the means for rotating the cam locking bar release and the tens-carrying assisting drive from the general operator during the return movement thereof.

Fig. 7 is a fragmentary section showing one of the clutches for changing the direction of rotation of one of the tens-carrying assisting shafts.

Fig. 8 is a fragmentary view, showing one of the numeral keys depressed, but at a time when the typewriter carriage is not in a computing zone, so that none of the pin-bearing rack bars are lifted to bring any of the rows of pins in alinement with the actuating linkages, thus showing that the linkages pass between the pins under such conditions.

Fig. 9 is a detail view, showing how a pawl on the general operator slips by the pin-restoring mechanism during the initial stroke of the general operator.

Fig. 10 is a view of the parts shown in Fig. 9, showing the pin-restoring mechanism actuated during the return stroke of the general operator.

Fig. 11 is a detail front view, showing how one of the tappets carried by the carriage actuates the bails or linkages during the forward step-by-step movement of the carriage in a computing zone, so as to raise the accordant rack bar so as to bring the pins thereon into alinement with the setting linkages.

Fig. 12 is a view of the parts shown in Fig. 11, with the exception that the carriage is moving in a return direction, so that the dog of the tappet slips idly past the transposition bails or linkages.

Fig. 13 is a skeleton perspective view, showing one numeral key and the associated linkage for setting the pins on the rack bars, and also showing one rack bar and one computing wheel of a computing head; the computing head being shown in a neutral position, and the rack bar at the bottom of its stroke, in an inactive position. The numeral key and its linkage are shown, however, to be actuated.

Figs. 14 to 21 show detached views of the several duplex assisting segments whereby the tens-carrying and borrowing action is finished for both adding and subtracting.

Fig. 22 is a detail view showing the tens-carrying mechanism in its ineffective position.

Fig. 23 is a view of the parts shown in Fig. 22 just after the special tooth has set the tens-carrying mechanism to receive a rotation from the assisting segments.

Fig. 24 is a fragmentary view in side elevation of certain of the parts shown in Fig. 13, with one of the rack bars, however, raised by the tappet on the carriage to a position such that the pins thereon are in alinement with the setting linkages, and also showing one of the numeral keys depressed to actuate the associated linkage to set the opposite pin on the raised rack bar.

Fig. 25 is a fragmentary plan view showing the echelon arrangement of the pin-setting linkages and their connection to the numeral keys.

Fig. 26 is a detached detail view, showing the locking cam bar which shifts the computing heads to their neutral position at all times except when a computation is being run up thereon. The bar is shown in its locking position.

Fig. 27 is a fragmentary sectional view showing the means for moving the cross bar on the general operator out of contact with the pin bearing rack bars, so that these bars will be free from friction when lifted by the column justifying mechanism actuated by the tappet on the carriage.

Fig. 28 is a fragmentary view in front elevation, showing two computing heads with the means for determining the setting of the computing heads as to adding, subtracting and neutral.

Fig. 29 is a detail horizontal sectional view through one of the computing heads, showing the subtracting racks in engagement with the gears of the computing wheels in the act of running up a subtracting computation on the computing head.

Figure 3:
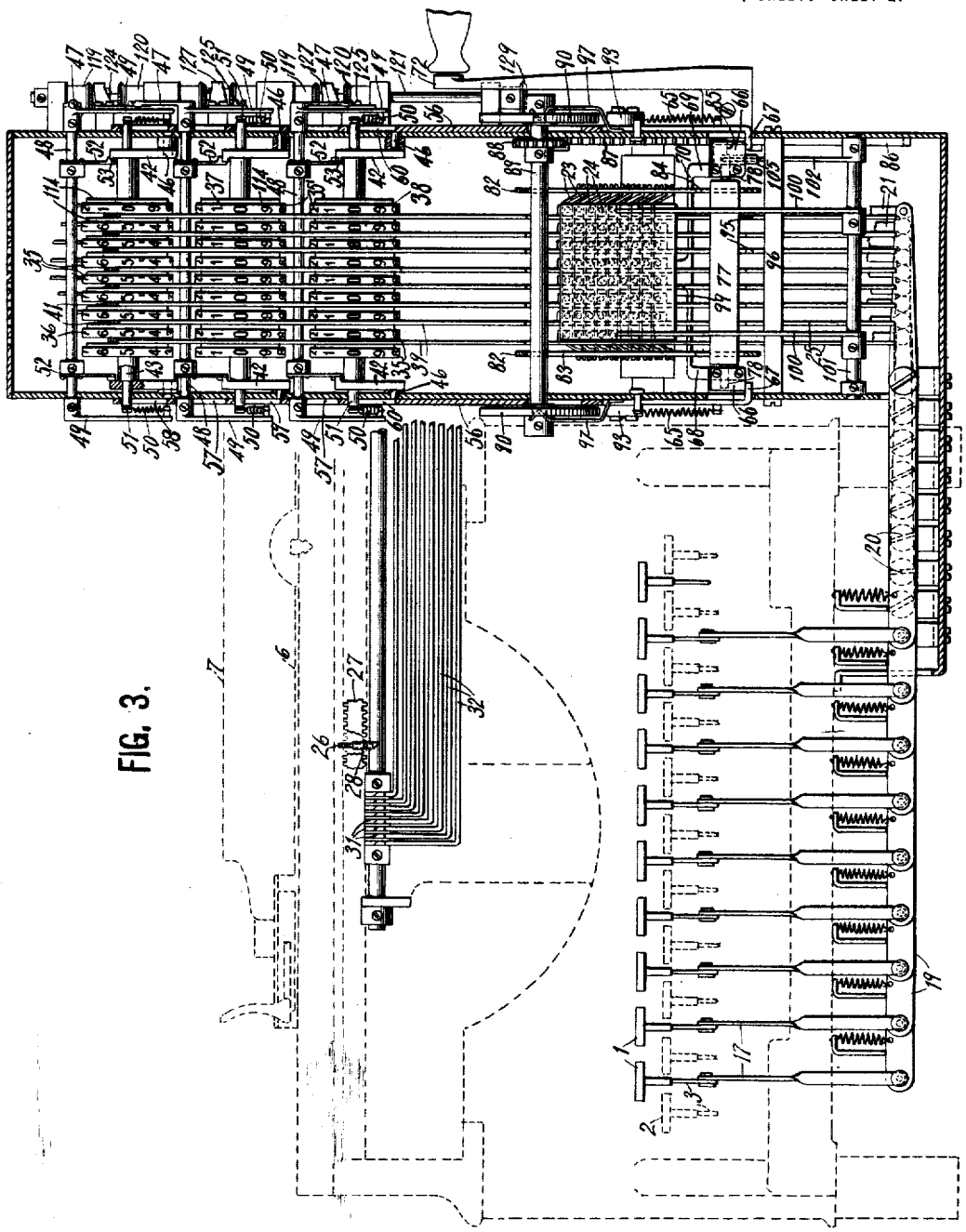
Fig. 3 is a front view in elevation.

Referring more particularly to the separate parts of this invention as embodied in the form shown in the drawings, numeral keys 1 and character keys 2 on levers 3 actuate, through the intermediary of bell cranks 4, type bars 5 to swing the latter up against the front side of a platen 6 mounted on a carriage 7.

Carriage 7 is normally under tension from a spring barrel 8 to move in a letter-feeding direction, which, however, is controlled by an escapement mechanism indicated in general at 9. This escapement mechanism includes a heel 10 on each of the type bars, which comes into engagement with a universal frame 11 to rock a pair of dogs 12 alternately meshing with an escapement wheel 13 carrying at its forward end a pinion 14 which meshes with a rack 15 movably mounted on the carriage 7 as by being hung on pivoted arms 16.

This mechanism is the well-known structure of the Underwood typewriting machine, and is combined with and connected to the computing mechanism, so as to coöperate therewith to simultaneously carry on a typewriting and a computing action.

The numeral keys from "1" to "9" each have secured thereon a depending link 17 which, as will be seen by reference to Fig. 13, has a pin and slot connection 18 to permit a certain amount of movement of the numeral key before the computing mechanism is started into action. The link 17 is connected at its lower end to one end of a spring returned lever 19, which is pivoted intermediate its ends at 20, and has pivotally connected to its opposite end a link 21, which extends upwardly into engagement with an offset arm 22 on a setting bar 23.

There is one of these sets of linkages for each of the numeral keys "1" to "9", and their pivots 20 and pivotal connections to the links 21 are arranged in echelon as will be seen by reference to Figs. 3, 4 and 25, to allow for the different positions of the numeral keys and the different positions of the arms 22. These arms 22, by the way, project outwardly gradually increasing amounts, as will be seen by reference to Fig. 25, to avoid the intermediate levers 19.

The setting bars 23, of which there is one for each of the numeral keys "1" to "9", are arranged in juxtaposition to a nest of pins 24. The pins 24 are arranged in rows or groups of nine pins corresponding to the numeral keys "1" to "9" on bars 25, which correspond to the digit or denominational columns of numbers to be computed. The pins are loosely mounted, so that they can be set from a projecting position on one side of the bar to a projecting position on the other side of the bar. Under normal conditions, however, when the typewriter carriage is not in a computing zone, the pins 24 are located out of alinement with the setting bars 23, so that if a numeral key should be actuated at this time, the setting bar 23 associated therewith will pass between the pins without setting the same.

For the purpose of bringing the pins 24 into a position where they can be struck by the setting bars 23 in juxtaposition to them so that they will project from the opposite side of the bars 25, there may be provided one or more tappets 26, adjustably mounted on a rack bar 27 on the carriage 7, so as to control the computing zone.

The tappet 26 has pivotally mounted thereon a dog 28 which is normally held by a spring 29 in engagement with a stop 30 on the tappet, so that during the forward movement of the carriage in a letter-feeding action, the dog 28 will come into engagement successively with a series of upstanding cam arms 31 on bails 32, so as to rock these bails successively. This action is shown clearly in Fig. 11. During the return of the carriage for a new line, the spring 29, as will be seen by reference to Fig. 12, will yield, so as to permit dog 28 to snap idly over the cam arms 31 without rocking the bails 32.

The bails 32 are nested one within the other and form part of a transposition mechanism which will act so that the first bail in order from right to left when actuated, will rock the first one from left to right of a series of levers 33 which are pivoted intermediate their ends and extend inwardly to the front of the machine. For this purpose the bails are provided with forwardly extending arms 34 which are pivotally connected to the rear ends of the levers 33. The levers 33 underlie at their forward ends projecting lugs 35ª provided on the bars 25, so that when one of the bails is rocked to pivot the associated lever 33, the corresponding bar 25 will be raised to bring the pins thereon in alinement with the pin-setting bars 23. These pin-setting bars are pivoted at their ends so that they, together with the arms 22, form in reality pivotally mounted bell crank levers arranged to engage all of the pins corresponding to one digit on the several bars 25. The levers 33 may be guided by a comb 200, and held in a normal position by springs 201.

It will thus be seen that as the carriage moves step-by-step in a computing zone, the several bars 25 will be successively raised to bring the pins thereon in alinement with the setting bars 23, so that when any numeral key is actuated at this time, the corresponding pin on the bar accordant with the denominational column being typewritten in, will be set to a position such that it projects on the opposite side of the bar. This set pin will subsequently determine the extent of movement of the bar 25. The bar 25 in reality forms a part of the valuating mechanism which determines the extent of rotation of computing wheels 35 of a series of computing heads, of which three, designated 36, 37 and 38, are shown in this instance.

The computing heads are arranged, however, so as to either add or subtract, and for this purpose the bars 25 are provided with a pair of spaced racks 39 and 40 facing in opposite directions, so as to form duplex rack bars which engage pinions 41 carried by each of the computing wheels 35. The rack 39 may be termed the subtracting rack, and the rack 40 may be termed the adding rack, in that when in engagement with the pinions 41, they respectively cause a rotation of the computing wheels 35 corresponding to a subtraction and an adding action of the computing head.

The racks 39 and 40 are sufficiently far apart, so that the pinions 41 can occupy an intermediate position in which they are in engagement with neither of the racks, so that the computing wheels will not be rotated when the pinions occupy this intermediate position.

While it is evident that the rack bars 25 could be swung to bring about the engagement of the racks 39 and 40 with the pinions 41, in this instance in view of the plurality of computing heads, the computing heads themselves are swung to effect the coöperative relation of the pinions 41 and the rack bars.

For this purpose, each of the computing heads, as will be seen by reference to Fig. 13, comprises a pair of side plates 42 connected by shafts 43, 44 and 45 to form a framework on which the various rotating parts of the computing head are mounted. The whole framework, and thus the whole computing head is pivotally mounted as by means of stub shafts 46, which support the computing head on the frame of the machine.

Each computing head as a whole, therefore, to add, is swung rearwardly, and to subtract is swung forwardly, while when inactive, it occupies an intermediate neutral position. The state of each computing head may be individually controlled by a lever 47 which, however, is yieldingly connected to its associated computing head, so that its determination is merely tentative, inasmuch as all of the computing heads occupy a neutral position intermediate the transferring actions of the pin-bearing rack bars 25.

Considering this structure specifically, each of the levers 47 is mounted on a shaft 48 which is provided at the opposite ends thereof with arms 49 having connected thereto springs 50. These springs 50 are connected to pins 51 which may form extensions of the shaft 43, inasmuch as this is the shaft on which the computing wheels 35 and their associated pinions 41 are loosely mounted, thus giving the shaft 43 as the point to which the pull is applied to shift the pinions into mesh with the racks 39 and 40.

Each computing head is locked in a normal neutral position to prevent accidental wabbling when the lever 47 is in a neutral position by means of spring arms 52 which engage notched lugs 53 on the plates 42. The levers 47 are also locked in their several positions of adjustment, as will be seen by reference to Fig. 28, by a spring latch 54 arranged to engage three notches 55 corresponding to the subtracting, neutral, and adding states of the associated computing head, the state being designated by an inscription on the face plate of the machine in juxtaposition to the notches.

As stated above, the computing heads always occupy a normal neutral position except when the racks 25 are being moved upward to transfer an indexed number thereto. To accomplish this, there is provided a locking bar 56 which has a pin and slot support, as indicated at 57 in Fig. 26, to permit a limited vertical movement thereof. The locking bar 56 also has a series of cam slots 58, 59 and 60, one for each of the computing heads 36 to 38 which are arranged to engage the shafts 43 of each of these computing heads, to shift the computing head to neutral position. To do this, the cam slots 60 are provided with converging cam sides 61 and 62, which direct the shafts 43 to an intermediate midway position into notches 64, no matter whether the shafts were in adding positions or subtracting positions.

The locking bar is normally under a traction, due to an extended spring 65 tending to raise it to its releasing position, but is held in its lower and locking position by means of a lug 66 engaging an inwardly extending projection 67 on the locking bar. The locking bars are in duplicate on opposite ends of the computing heads, so as to insure a balanced action. As soon as these lugs 66, however, rise, the springs 65 will be permitted to raise the locking bars 56 until the shafts 43 come into the enlarged portion of the slots 58 to 60, permitting such of the springs 50 as have been previously tensioned to swing the associated computing head to either its adding or subtracting position, according to the position of the associated lever 47.

Lugs 66 are mounted on the tines 68 and 69 of a bifurcated lever 70, which forms a part of a general operator. The lever 70 is pivoted at its rear end and normally held in a depressed position by a spring 71.

To actuate the lever 70, there is provided a crank 72 mounted on a shaft 73, on which are also secured a pair of arms 74 connected by a cross arm 75 underlying the lever 70, and engaging therewith. In normal position the crank 72 is shown in Fig. 1 raised against an adjustable stop 76. When the crank 72 is drawn downwardly, it acts to raise the lever 70 to release the double locking slide bar 56, permitting it to be pulled up by its spring 65, so as to release the computing heads. In addition to releasing the locking bar, the movement of the lever 70 is utilized to reciprocate such of the rack bars 25 as have had pins previously set up thereon. To accomplish this, there is provided at the forward end of the lever 70 a universal cross bar 77, which is provided at its extremities with pins 78 engaging in slots 79 in the tines 68 and 69 of the lever 70. This pin and slot connection permits the universal bar 77 to always remain in engagement with the set pins during the arcuate motion of the lever 70.

There are provided springs 80 connected to the pins 78 and engaging other pins 81, so as to normally tend to hold the cross bar 77 in contact with the rack bars 25, so that it will be in position to engage the set pins thereon. These springs not only yield to allow for the arcuate motion of the lever 70, but also yield when the lever 70 is in its normal inactive position, so as to remove cross bar 77 out of contact with the rack bars 25, to permit them to move freely without friction when raised by the column selecting mechanism.

For this purpose, as will be seen by reference to Fig. 27, there is provided a pair of plates 82 through slots 83 in which the cross bar 77 extends. These slots 83 are provided adjacent their lower ends with cam edges 84, which are adapted to cam the universal bar 77 out of engagement with the rack bars 25 as the lever 70 reaches its lowermost position.

As has been said above, each computing head occupies an intermediate or neutral position between each operation of transferring a number thereto from the pin setting mechanism. To accomplish this before the rack bars start on their downward movement, there is connected to the lever 70 by a pin and slot connection 85, a rack bar 86 which is adapted to reciprocate as the lever 70 oscillates.

On one side of the rack bar 86, there is provided a rack 87 which meshes with a pinion 88 on a shaft 89. There is also provided on the shaft 89 a pair of cams 90, one for each locking bar 56, each of which cams for the greatest part of its circumference, is concentric with the center of the shaft, that is to say, has a cylindrical surface. At one point, however, in this cam there is provided a dip or socket 91 having a gradually rising surface 92 to the outer major periphery of the cam.

Under conditions such that the computing heads actually occupy their true computing positions as to adding and subtracting, the locking bars 56 are in their raised position, so that cam followers 93 thereon engage in the sockets 91 of the cams 90. When the rack bar 86 rises with the rise of the lever 70, the motion thereof is not transmitted to the shaft 89 and the cams 90, because of the fact, as will be seen by reference to Fig. 6, that the gear 88 has a one-way clutch connection 94 with the shaft 89. This clutch connection is of the spring ball and cam socket type, such that when the pinion 88 is rotated counterclockwise (in Fig. 6) it will rotate idly. When, however, the pinion 88 is rotated clockwise, the ball of the clutch will rigidly connect the pinion 88 with the shaft 89, so that the cams 90 will be rotated. That is to say, as soon as the lever 70 starts on its downward swing, so as to return the rack bar 86, the cams 90 will be rotated sufficiently to force the followers 93 out of the sockets and on to the major portion of the cams 90. This movement is sufficient to stretch the springs 65 and draw down the locking bars 56 to a position, such that the cam slots thereon will force all of the computing heads to an intermediate or neutral position.

The rack bars 25 may fall by gravity as soon as they are disconnected from the gears of the computing heads, but in order to make this positive, the universal cross bar 77 may come into engagement with lugs 95 on the rack bars 25 during the downward stroke of the lever 70. These lugs are, however, so positioned, that the cross bar 77 will not come into engagement therewith until the rack bar 86 has moved downwardly sufficiently to cause the cams 90 to disconnect the computing heads from the rack bars 25.

Lugs 95 may also form limit stops by engagement with a guiding comb 96 to determine the extent of the downward movement of the rack bars 25. It will be noted that the cams 90 rotate practically a full revolution corresponding to the complete downward stroke of the lever 70, and that when these cams have completed their revolution, the sockets 91 will once more come into alinement with the follower 93. Before this occurs, however, the lugs 66 come into engagement with the inwardly extending projection 67, so as to hold the locking bars 56 down in their locking position. The bars will move slightly further in view of the fact that it is necessary to swing the lever 70 decidedly farther downward, to bring the followers 93 into register with the sockets 91. The final position of the cams 90 with the sockets 91 superposed in respect to the followers 93, is determined by a pair of spring latches 97, each of which engages a slot or notch 98 provided in the side of the adjacent cam 90.

For the purpose of returning the pins 24 after they have served the purpose to determine the extent of movement of the rack bars 25, there is provided a pin-restoring plate 99 which as will be seen by reference to Figs. 9 and 10, is mounted on an arm 100 in such a position that it will blanket all of the pins 24 in the nest.

Arm 100 is secured to a shaft 101 which also has secured thereto an arm 102 with a cam hook 103. These parts which together form a bell crank lever, are normally held in the position shown in Fig. 9 by means of a spring 104. To rock the bell crank lever so as to force the pin-restoring plate from the position shown in Fig. 9 to the position shown in Fig. 10, there is provided on the lever 70 an actuating pawl 105 which is pivotally mounted and normally held by means of a spring 106 in engagement with a stop 107. It will be seen that during the upstroke of the lever 70, the spring 106 will yield to permit pawl 105 to snap idly past the hook 103 without rocking the bell crank lever. At the end of the downward stroke, however, of the lever 70, the cam back of the pawl 105 will engage the cam top of the hook 103 and rock the bell crank lever to the position shown in Fig. 10, so that the pin-restoring plate 99 will be slapped up against such of the pins as have been previously set to return them to their normal position. The spring 104 will return the pin-restoring plate to its normal position after the pawl 105 is slipped outwardly past the hook 103. The limit of return motion is determined by a stop 108 engaging the arm 100.

For the purpose of carrying tens from a lower denomination to a higher, or borrowing "1" from a higher denomination to a lower, each of the computing heads is provided with a tens-carrying mechanism which, however, is normally effective solely when the computing heads occupy their normal neutral positions out of engagement with both the racks 39 and 40.

Referring to Figs. 13, 22 and 23, it will be seen that each of the computing wheels 35 is provided with a special tooth 109 which once in a revolution of the computing wheel, engages a mutilated gear 110 on the shaft 44. This gear is shown to be provided with nine teeth, every third one of which is cut away, so as to offer a gap to the associated one of a series of assisting segments or sectors 111 on a shaft 112, so that as the associated assisting segment rotates with the shaft 112, it will pass idly by the mutilated gear 110 without rotating the same. Such a condition of affairs is shown in Fig. 22. If, however, the number on the computing wheel has passed from "9" to "0," the special tooth 109 will have engaged one of the teeth on the mutilated gear 110, so as to swing it in such a position that one of the teeth thereof will be moved into the path of the assisting segment 111 which coöperates therewith, to rotate the mutilated gear a further amount, which together with its previous rotation, will amount to one-third of a revolution.

Secured to each of the mutilated gears 110, there is provided a three-toothed carrying gear 113, which meshes with a gear 114 secured to the next higher computing wheel 35. The computing wheels 35 and the tens-carrying wheels comprising the pinion 113 and the mutilated gears 110 are locked in their proper position respectively by dogs 115 and 116 held in engagement respectively with the gears 114 and the mutilated gears 110 by a spring or springs 117.

It will be noted that the assisting segments 111 are duplex, that is to say, they have two arms, either one of which may coöperate with the associated mutilated gear 110, according to the direction of rotation of the shaft 112. These arms, as will be seen by reference to Figs. 14 to 21, gradually change their relative position in the individual segment from the position shown in Fig. 14 through the successive figures as numbered in order until they merge in a single arm, as shown in Fig. 21. This is so that the arms will extend spirally on the shaft 112, and in opposite directions, so that the action of each one will take place subsequent to the action of the next preceding one, that is to say, the tens-carrying and tens-borrowing is first carried on from units to tens, then from tens to hundreds, and so on up to the highest denomination.

It will be noted in passing that one of the arms of the segment 111 is actuated to shift the mutilated gear 110; the gap in the mutilated gear will be opposite the other arm when it comes around so that it will pass ineffectively by.

The rotation of each shaft 112 in one direction will cause a tens-carrying to correspond with an adding action of the associated computing head, and a rotation of the shaft 112 in the opposite direction will cause a tens-borrowing corresponding to a subtracting action of the associated computing head. In order that the shafts 112 may be rotated in directions according with the state of the associated computing heads, there is provided on each of the shafts 112 a bevel gear 118, as will be seen by reference to Figs. 1 and 7, meshing with a pair of oppositely faced bevel gears 119 and 120 loosely mounted on a shaft 121.

The gears 119 and 120 are provided with notched faces 122 and 123 into engagement with which may be brought a double faced clutch 124, splined on the shaft 121 so as to rotate therewith, and yet capable of sliding relatively thereto to connect either of the gears 119 and 120 in driven relation with the shaft 121.

The clutches 124 are controlled in their positions by the levers 47 which control the tentative positions of the computing heads. For this purpose there is provided on one of the arms 49 actuated by the lever 47 a pin 125 which engages a slot 126 on a lever 127 pivoted intermediate its ends and having pins 128 at its opposite end engaging in an annular groove in the associated clutch 124. There is one of these levers for each of the computing heads, and they are actuated simultaneously with the actuation of the levers 47; but in contradistinction to the computing head; the clutches when shifted occupy the shifted position irrespective of the position of the locking bars 56, which is necessary inasmuch as the tens-carrying operation takes place during the return movement of the lever 70, while the computing heads occupy a normal neutral position.

To rotate the shaft 121 during the return movement of the lever 70 which as previously stated forms with the associated parts a general operator, there is provided on the lower end of the shaft 121 a bevel gear 129 which meshes with a bevel gear 130 on a shaft 131. Loosely mounted on the shaft 131, there is provided, as will be seen by reference to Fig. 6, a gear 132 which meshes with a rack 133 formed on the reciprocating bar 86. The gear 132, however, may be connected during the downward movement of the bar 86, by means of a one-way clutch 134, so that the rotation of the gear 132 is transmitted to the shaft 131 to rotate the shaft 121. The clutch 134 is similar to the clutch 94 and does not connect the gear 132 to the shaft 131 during the initial or upward movement of the lever 70 and the rack bar 86.

In the use of the device, the levers 47 are first set to determine the state under which the associated computing head will exist during the subsequent computing action. The heads, however, themselves are not moved, but remain in their normal neutral position because of the fact that the bars 56 are in their locking position, but the springs 50, in the case of either adding or subtracting, are stretched to either one side or the other, so as to tend to pull the computing heads in that direction.

In Fig. 1, the upper computing head 36 has its lever 47 thrown to a neutral position, so that its spring is not tensioned, and it will be locked in a neutral position, even if the locking bars 56 are subsequently raised. The spring of the computing head 37, however, is under a tension tending to throw the computing head 37 into engagement with the racks 39 owing to its lever 47 being swung up to a subtracting position. In the case of the lower computing head 38, the lever 47 is swung down to an adding position, so that the spring is stretched in the opposite direction tending to throw the computing head 38 into engagement with the racks 40. In throwing the levers 47 the clutches 124 are also shifted to positions corresponding to the states of the associated computing heads, that is to say, if lever 47 of a computing head is swung to adding, the clutch 124 will be moved to cause a rotation of the associated shaft 112 in one direction, and if the same lever is swung to subtracting, the clutch will be shifted to the opposite extremity of its movement to cause a rotation of the shaft 112 in the opposite direction, but if the lever occupies an intermediate neutral position, the clutch 124 will be disconnected from both of the opposed clutch faces, so that the associated shaft 112 will be idle.

With the computing head state controlling mechanisms set to accumulate the computation in the manner desired, the typewriter carriage 7 is brought to a computing zone, so that the tappet 26 carried thereby will successively actuate the several bails nested together.

When a numeral key is first struck to write in a certain column on the work sheet carried by the carriage, the tappet 26 will have rocked the corresponding bail 32 so as to lift the forward end of the associated column lever 33 which in turn will have raised the corresponding rack bar 25, so that the pins thereon will come into alinement with the several setting bars 23. Inasmuch as the key, at the same time that it is struck, actuates the corresponding setting bar 23, the pin on the particular pin bar corresponding to the key struck, will be set in a position projecting from the opposite side of the rack bar. As the key is released, the carriage springs forward under the control of the usual escapement mechanism 9, bringing the tappet 26 over the next bail in the series, whereby the next pin bearing rack bar corresponding to the next column on the work sheet, will be raised to have a pin set thereon. A numeral key is then struck to set the accordant pin on this rack bar. This is repeated until all of the digits of the number are set up or indexed by the setting of pins on the several rack bars. The number thus indexed is then transferred to such of the computing heads, as may be tentatively set forth adding or subtracting, and in this illustration to the computing heads 37 and 38. To do this, the crank 72 is pulled downwardly and forwardly from the position shown in Fig. 1 to the position in Fig. 5. In moving downwardly the crank 72 forces the arm 74 upwardly to swing the lever 70 also upwardly. The upward movement of the lever 70 moves the lugs 66 from contact with the inward projections 67 on the locking bars 56, thus rendering the springs 65 thereon free to move the locking bars up to their releasing position, so that the enlarged portions of the slots 58, 59 and 60 come circumjacent the shift pins 51; the springs 50 in the case of the computing heads 37 and 38 are thereby enabled to swing these computing heads in the direction of pull of the springs, that is to say, the computing head 37 will be swung to the position shown in Fig. 5 with the pinions of the computing wheels thereof in mesh with the subtracting racks 39, and the computing head 38 will be swung to the right with the computing wheel pinions thereof in mesh with the adding racks 40. This all occurs before the universal bar 77 carried by the lever 70 comes into engagement with the first ones of the set pins 24 on the rack bars 25.

Further movement of the lever 70 brings the universal bar in contact with these set bars, so that the rack bars are moved upwardly varying amounts according to the particular location of the individual set pins. This variable travel is transmitted to the corresponding computing wheels of the computing heads in a direction in accordance with the previous set of the computing heads, that is to say, the computing wheels of the computing head 37 will be rotated to subtract and those of the computing head 38 will be rotated to add.

All of the transferring of the numbers from the pin mechanism to the computing heads is carried on during the downstroke of the crank 73 and the upstroke of the lever 70. The return stroke of these parts is used to carry or borrow tens from such of said computing wheels as have passed between "9" and "0," to the computing wheels of the next denomination. In case of adding, the tens will be carried up to the next higher denomination computing wheel, and in case of subtracting the tens will be taken away from the next higher denomination, but inasmuch as the tens-carrying action takes place only when the computing heads are in their neutral position, it is necessary to shift the locking bars 56 down to their lower position, whereby the computing heads are returned to an intermediate neutral position.

When the lever 70 moves downwardly, it carries with it the rack bar 86 which through the intermediary of its rack 87 and the pinion 88, rotates the cam 90 to force the cam followers 93 on the locking bar 56 downwardly to the position occupied in Figs. 1 and 2, whereby the cam edges of the slots will force the engaging pins 51 of the computing heads to an intermediate position. The rack bar 86 also rotates the pinion 132, which is connected by its clutch 134 so as to rotate such of the shafts 112 as have their clutches thrown into either an adding or subtracting position. In this case, these would be the shafts of the tens-carrying mechanism associated with the computing heads 37 and 38. It will thus be seen that such of the computing wheels of each of said computing heads as have changed between "9" and "0," so as to set the associated mutilated gear 49, will be assisted in each instance by the associated segment on the corresponding shaft 112 to carry or borrow tens to or from the computing wheel of the next higher denomination.

It will be noted by virtue of the one-way clutches 94 and 134, that the upward movement of the rack 86 was an ineffective one, that is, as far as the actuation of the bars for shifting the computing heads and the actuation of the tens assisting shaft 121 are concerned. The bars 56 which in addition to being locking bars, shift the computing heads and therefore may be termed shifters, are caught in their depressed position before the sockets 91 come into register with the followers 93, by the lugs 66, depressed slightly and held in depressed position until a subsequent operation of the crank 73 is necessary.

It will be seen that inasmuch as the computing heads are all disconnected from the rack bars 25 during the setting up of the digits of a number, the movements of the rack bars 25 through the column selecting mechanism to bring the pins into register with the setting links 23, again take place without disturbing the computing wheels of the computing heads.

Variations may be resorted to within the scope of the invention, and portions of the improvements may be used without others.

Having thus described my invention, I claim:

1. In a computing machine, the combination with a plurality of computing heads, of mechanism for indexing or setting up all the digits of a number to be computed, means for transferring the number so indexed to any active computing head, resilient means individual to each computing head to set or prime each head so that it tends to assume an addition state or a subtraction state, under the action of said resilient means, for receiving indexed numbers, and means permitting said resilient means to bring each head to an active state, irrespective of any other head, during the time said transferring means is in action.

2. In a computing machine, the combination with a plurality of computing heads, of mechanism for indexing or setting up all the digits of a number to be computed, means for transferring the number so indexed to any active computing head, under the action of said resilient means, means individual to each computing head to set or prime each head so that it tends to assume an addition state or a subtraction state, for receiving indexed numbers, means permitting said resilient means to bring each head to an active state, irrespective of any other head, during the time said transferring means is in action, and means for restoring all the computing heads to a neutral state against the tendency of said resilient means after said transferring means finishes its action.

3. The combination with a computing head, of means for actuating said head, a lever for shifting said head into engagement with said means, a yielding connection between said lever and said head, and locking means for holding said computing head in a position contrary to the position of said lever.

4. The combination with a computing head, of means for actuating said head, a lever for shifting said head into engagement with said means, a yielding connection between said lever and said head, locking means for holding said computing head in a position contrary to the position of said lever, and means for releasing said locking means to enable said yielding connection to position said computing head in accordance with the position of said lever.

5. The combination with a computing head, of means for actuating said computing head, a lever for shifting said head into engagement with said means, a yielding connection between said lever and said head, and a shifter for moving said computing head out of engagement with said means against the tension of said yielding connection.

6. In a computing machine, the combination with a computing head, actuating means and tens-carrying assisting mechanism therefor, of means for moving said computing head with respect to said actuating means from a neutral state to either an addition state or a subtraction state, said actuating means being ineffective on said computing head in a neutral state, and said tens-carrying assisting mechanism being effective on said computing head solely when in a neutral state, and means for moving said computing head to a neutral state prior to a movement of said tens-carrying assisting mechanism.

7. The combination with a computing head, of means for actuating said computing head, said computing head being shiftable into and out of coöperation with said means, a spring connected to said computing head, and a lever connected to the opposite end of said spring whereby said spring may be stretched to tend to shift said computing head.

8. A computing head comprising a pair of side plates, shafts connecting said plates to form a frame, means for pivotally mounting said frame, computing wheels rotatably mounted on one of said shafts, and means for exerting a pull at a point in line with the center of the axis of said computing wheels to shift said computing head about the pivot point of said frame.

9. In a computing machine, the combination with a computing head, of actuating means therefor, a lever, a spring connecting said lever and said computing head, whereby said lever may control the movement of said computing head into and out of coöperation with said actuating means, said spring being under tension when said lever is in position to shift said head to one position, but free from tension when said lever shifts said head to another position, and means for locking said computing head when in a position where said spring is untensioned.

10. In a computing machine, the combination with a computing head, of a series of rack-bars for actuating said computing head normally disengaged therefrom, a series of pins on each of said rack-bars, setting mechanism for said pins, said setting mechanism being normally located out of alinement with said pins, a carriage, levers connected to said bars to move them while out of engagement with said computing head, so that the pins thereon will come into alinement with said setting mechanism, and means controlled by said carriage for moving said levers in succession.

11. In a computing machine, the combination with a plurality of computing heads, of mechanism for indexing numbers, means for transferring the numbers so indexed to any active computing head, means individual to each computing head to set or prime each head, so that it tends to assume an addition state or a subtraction state, for receiving indexed numbers, and a shifter for controlling each head, said shifter comprising slidingly-mounted bars having cam slots therein, the slots being so shaped that on movement of the bars in one direction, each computing head is permitted to move under action of its primed means to bring said head to active position, irrespective of any other head, during the time said transferring means is in action, said slots also acting on movement of said bars in the other direction to restore all the computing heads to a neutral state after said transferring means finishes its action.

12. The combination with a computing head, of a cam bar for determining the state of said computing head, a general operator for enabling the running up of numbers on said computing head, a lug on said general operator, and a projection on said bar located in the path of said lug so that when said general operator is in its normal position said bar will be held in its normal position.

13. The combination with a computing head, of a cam bar for determining the state of said computing head, a general operator for enabling the running up of numbers on said computing head, a lug on said general operator, a projection on said bar located in the path of said lug so that when said general operator is in its normal position said bar will be held in its normal position, and a spring tending to move said bar from its normal position, said spring acting when said general operator is operated to remove said lug from engagement with said projection.

14. In a computing machine, the combination with a computing head, of means for indexing numbers to be run into said head, actuating means for running into said head the numbers indexed, a general operator for reciprocating said actuating means, a shifter for moving said computing head out of engagement with said actuating means at the beginning of the return stroke of the general operator, a follower on said shifter, and a cam arranged to engage said follower, said general operator actuating said cam, said general operator also at the completion of its return stroke directly engaging said shifter to move it further in the direction to which it has been moved by said cam.

15. In a computing machine, the combination with a computing head, of actuating means therefor, normally disengaged therefrom but engageable with said computing head during the primary movement of said actuating means, a general operator for reciprocating said actuating means, a shifter for moving said computing head out of engagement with said actuating means at the beginning of the return stroke of the general operator, a follower on said shifter, a cam having a depression therein arranged to engage said follower, said depression permitting said shifter to move to free said computing head from the control of said shifter when said cam is in such position that said follower engages said depression, and means controlled by said general operator at the completion of its return stroke for moving said shifter in the direction in which it is moved by said cam, to prevent said follower from engaging said depression, until said general operator has made a slight movement on its next actuating stroke.

16. The combination with a computing head, of means for running up numbers on said computing head, a tens carrying mechanism, said computing head being shiftable to alternately render said means and said mechanism effective, a general operator for operating said means and said mechanism respectively on alternate strokes, and means controlled by said general operator for determining the position of said computing head for the different strokes.

17. The combination with a computing head, of a series of rack bars for actuating said computing head, pins on said bars, setting bars for setting said pins, an arm integral with each of said setting bars, a series of numeral keys, and linkages connecting each of said arms with one of said numeral keys.

18. The combination with a computing head, of rack bars for actuating said computing head, pins on said rack bars, setting bars for setting said pins, an arm on each of said setting bars, said arms being of graded length so as to project one beyond the other, a series of numeral keys, and linkages for connecting each of said arms with one of said keys.

19. The combination with a computing head, of rack bars for actuating said computing head, pins on said rack bars, setting bars for setting said pins, an arm on each of said setting bars, said arms being of graded length so as to project one beyond the other, a series of numeral keys, and linkages for connecting each of said arms with one of said keys, said linkages comprising a link connected to each of said arms, and a lever connected to each link and to the corresponding numeral keys.

20. In a computing machine, the combination with a series of valuating bars, of a pivotally-mounted lever for giving said bars valuating movements, a universal bar on said lever, means for normally holding said universal bar in engagement with said valuating bars, and means for forcing said last-mentioned bar out of engagement with said valuating bars as said universal bar reaches normal position to permit free movement of said valuating bars.

21. The combination with a computing head, of actuating means for said computing head, a universal bar engaging said actuating means to operate the same, said actuating means being temporarily movable to determine the extent of subsequent movement, and means for removing said universal bar out of engagement with said actuating means, to permit the free temporary movement of said actuating means.

22. The combination with a computing head, of a series of rack bars for actuating said computing head, pins settable on said rack bars to determine the extent of movement thereof, a pivotally mounted lever, a universal bar arranged to engage said pins, and floatingly mounted on said lever so as to allow for the arcuate motion in maintaining said universal bar in engagement with said pins and said rack bars, said rack bars being movable to admit of the setting of said pins, and means to move said universal bar out of engagement with said rack bars during the pin setting operation.

23. In a computing machine, the combination with a series of computing heads, of actuating devices for engagement with said heads and common to all of them, and means for selectively rendering any of said computing heads active with respect to said actuating devices, either to perform addition or to perform subtraction, so that the number to be computed may be run up on the active computing head.

24. In a computing machine, the combination with a series of computing heads, of actuating devices for engagement with said heads and common to all of them, and means for rendering any or all of said computing heads active with respect to said actuating devices, either to perform addition or to perform subtraction, so that the number to be computed may be run up on all of the active computing heads concomitantly.

25. In a computing machine, the combination with a series of computing heads, of actuating devices common to all of said heads, and means for selectively rendering any two of said computing heads active for either addition or for subtraction with respect to said actuating devices, so that the number to be computed is run up on the selected heads concomitantly, whereby one head may show the sum of debit items, another head may show the sum of credit items, and a third head may show the difference.

26. The combination with a plurality of computing heads, of means universal to all of said computing heads and available to actuate any or all of said heads at a time, a traveling carriage means controlled by said carriage and connected to said universal means to control the action of the same, and shifting means operable in any position of said carriage and individual to said computing heads for selectively moving any or all of said computing heads at a time into engagement with said universal means.

27. The combination with a plurality of computing heads, of means universal to all of said computing heads arranged on one side thereof for enabling one kind of a computation, and means universal to all of said computing heads arranged on the other side thereof to enable another kind of a computation, a traveling carriage, means controlled by said carriage and connected to said universal means, and means operable in any position of said carriage for selectively shifting any or all of said computing heads into operative connection with either of said universal means at any position of said carriage whereby a plurality of said computing heads may carry on at the same time a number of computations of the same or different characters with a set of numbers.

28. In a computing machine, the combination with a computing head, of means for actuating said computing head to run up numbers selectively either for adding or for subtracting, yielding means tending to move said computing head into engagement with said actuating means to one position or the other, according to the type of computation desired, a general operator for moving said actuating means to run up a number into said computing head, a member normally acting to hold said computing head in a neutral position out of engagement with said actuating means, and means controlled by said general operator on the initial movement thereof to release said holding member.

29. The combination with a computing head, of means for actuating said computing head according to the position thereof for either adding or subtracting, a bar for maintaining said computing head in a neutral position corresponding to neither adding nor subtracting, a spring tending to release said bar, a general operator for actuating said first-mentioned means to run up a number into said computing head, and means on said general operator for holding said bar in its restrained position, during a part of the time said general operator is in action.

30. The combination with a computing head, of duplex actuating means for said computing head arranged to run up numbers on said computing head according to addition or subtraction, a spring for drawing said computing head into engagement with said actuating means according to addition or subtraction, and means for tensioning said spring selectively for addition or subtraction.

31. In a computing machine, the combination with a computing head, actuating means, and tens-carrying assisting mechanism therefor, of means for shifting said computing head bodily into position for coöperating with said actuating means, and out of position to coöperate with said tens-carrying assisting mechanism, a general operator reciprocating said actuating means to run up numbers on said computing head, and means operative on the return stroke of said general operator for shifting said computing head bodily out of position for coöperation with said actuating means, and into position for coöperating with said tens-carrying assisting mechanism.

32. The combination with a plurality of computing heads, of computing mechanism for indexing in a group all of the digits of a number to be transferred to said computing heads, transferring mechanism universal to all of said computing heads connected to said computing mechanism and arranged to transfer an indexed number to any or all of said computing heads at the same time and according to an adding or a subtracting operation, a general operator for said actuating means, and means bringing about a coöperation between said transferring means and said computing heads during the initial stroke of said general operator and for interrupting the operative connection between said transferring means and said computing heads during the return stroke of said general operator.

33. The combination with a computing head, of tens-carrying mechanism for said computing head, means for running up numbers on said computing head, assisting mechanism for said tens-carrying mechanism, said assisting mechanism being located out of effective reach of said tens-carrying mechanism during the running up of a number, and shifting means for bringing said tens-carrying mechanism and said assisting mechanism within effective reach of each other after a number has been run up.

34. The combination with computing wheels, of tens-carrying mechanism for said computing wheels, special teeth on said computing wheels for starting said tens-carrying mechanism in action, assisting mechanism for driving said tens-carrying mechanism, and means for varying the distance between said assisting mechanism and said tens-carrying mechanism so as to determine the effectiveness or ineffectiveness of said assisting mechanism to drive said tens-carrying mechanism.

35. In a computing machine, the combination with a computing head, of indexing mechanism therefor, actuating means for said computing head, said actuating means and said computing head being normally disengaged, resilient governing means settable to tend to effect an engagement between said actuating means and said computing head, a general operator for running into said computing head the numbers indexed, and means controlled by said general operator on its initial movement for permitting action of said governing means.

36. In a computing machine, the combination with a computing head including number wheels, of indexing devices therefor, actuating members individual to each wheel, said actuating members and said computing head being normally disengaged, denominational selecting means acting to slightly move each one of said actuating members during denominational selection and during the time each member and its corresponding wheel are disengaged, governing means settable to tend to effect an engagement between said actuating members and said computing head, means for normally preventing said governing means from acting during the denomination-selecting operation, and means for releasing said preventing means prior to the running in of a number into said computing head.

37. The combination, with a computing head capable of existing in adding, subtracting and neutral states as regards computation, but normally existing in the last-named state; of mechanism for indexing or setting up in a group all of the digits of a number to be computed; means for transferring the number so indexed to said computing head; state-controlling means; and resilient means connected to said state-controlling means acting to initially set or prime said head so that it tends to selectively assume either an adding or a subtracting state, and to subsequently cause said head to actually assume the state so selected, the subsequent action of said controlling means taking place solely during the action of said transferring means.

38. The combination, with a computing head capable of existing in adding, subtracting and neutral states as regards computation, and having a different definite position for each of such states, but normally occupying the position corresponding to the neutral state; of mechanism for indexing or setting up in a group all of the digits of a number to be computed; means for transferring the number so indexed to said computing head; state-controlling means; resilient means connected to said state-controlling means acting to initially set or prime said head so that it tends to selectively move either to its adding or its subtracting position, and to subsequently shift said head to the position so selected, the subsequent action of said state-controlling means taking place solely during the action of said transferring means; and means for returning said head bodily to said neutral position after said transferring means finishes its action.

39. The combination, with a pair of independent registers; of a single set of integral actuating members for driving both registers simultaneously; a single indexing mechanism for determining the extent of drive by said actuating members so that the same number will be run up; and a state-controlling device individual to each register for determining the character of computation to be carried on thereby.

40. The combination, with a plurality of separated registers, all arranged in a common plane; of a single set of U-shaped actuating members for said registers straddling all of them, so as to drive them all at the same time and in either of two directions; a single setting mechanism associated with said actuating members for controlling the extent of movement thereof, thereby to cause said actuating members to run the same number simultaneously into all of said registers; and means individual to each register for controlling both its effectiveness to be driven by said actuating members and the direction of such drive.

BURNHAM C. STICKNEY.

Witnesses:
C. RIPLEY,
B. GOLDBERG.

Copies of this patent may be obtained for five cents each, by addressing the "Commissioner of Patents, Washington, D. C."